United States Patent
Wu et al.

(10) Patent No.: US 9,986,465 B2
(45) Date of Patent: May 29, 2018

(54) METHOD AND SYSTEM FOR RETURNING TO LONG TERM EVOLUTION NETWORK AND MOBILE SWITCHING CENTER

(71) Applicant: Huawei Technologies Co., Ltd., Shenzhen (CN)

(72) Inventors: Xiaobo Wu, Shanghai (CN); Hai Liu, Shanghai (CN); Lin Shu, Shanghai (CN); Yanyan Chen, Shenzhen (CN); Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

(21) Appl. No.: 15/208,311

(22) Filed: Jul. 12, 2016

(65) Prior Publication Data
US 2016/0323785 A1  Nov. 3, 2016

Related U.S. Application Data

(63) Continuation of application No. 14/561,037, filed on Dec. 4, 2014, now Pat. No. 9,497,665, which is a continuation of application No. PCT/CN2012/076517, filed on Jun. 6, 2012.

(51) Int. Cl.
*H04W 36/00* (2009.01)
*H04W 36/32* (2009.01)
*H04W 88/00* (2009.01)

(52) U.S. Cl.
CPC ... *H04W 36/0005* (2013.01); *H04W 36/0016* (2013.01); *H04W 36/0022* (2013.01);
(Continued)

(58) Field of Classification Search
CPC ......... H04W 36/0016; H04W 36/0022; H04W 36/14; H04W 36/16; H04W 36/26;
(Continued)

(56) References Cited

U.S. PATENT DOCUMENTS

2003/0104813 A1   6/2003  Julka et al.
2011/0317659 A1  12/2011  Ramachandran et al.
(Continued)

FOREIGN PATENT DOCUMENTS

CN   101854600 A   10/2010
CN   102316554 A    1/2012
(Continued)

OTHER PUBLICATIONS

"Push UE back to LTE after CSFB/SRVCC," 3GPP TSG SA WG2 Meeting #84, Naantali, Finland, TD S2-113113, 3rd Generation Partnership Program, Valbonne, France (Jul. 11-15, 2011).
(Continued)

*Primary Examiner* — Jean Gelin
(74) *Attorney, Agent, or Firm* — Leydig, Voit & Mayer, Ltd.

(57) ABSTRACT

Embodiments of the present invention disclose a method, a mobile switching center and a system for returning to a long term evolution network, which may prevent a UE which does not need to return to the LTE network from mistakenly returning to the LTE network. The method includes: receiving a first CSFB indication corresponding to a UE that is sent by a MME after the UE initiates CSFB, wherein the first CSFB indication is used for identifying that the UE needs to return to a LTE network after circuit service of the UE is finished; and sending, according to the first CSFB indication, a second CSFB indication corresponding to the UE to an RNC/BSC when the circuit service of the UE is finished, wherein the second CSFB indication is used for indicating that the RNC/BSC is to notify the UE of returning to the LTE network.

1 Claim, 6 Drawing Sheets

(52) U.S. Cl.
CPC ........ *H04W 36/32* (2013.01); *H04W 36/0033* (2013.01); *H04W 36/0055* (2013.01); *H04W 88/005* (2013.01)

(58) Field of Classification Search
CPC .............. H04W 72/042; H04W 72/10; H04W 72/1247; H04W 76/026; H04W 76/02; H04W 76/027; H04W 76/046; H04W 36/0033; H04W 36/0055
USPC ......... 455/414.1, 435.1, 436, 446, 450, 451, 455/452.2
See application file for complete search history.

(56) References Cited

U.S. PATENT DOCUMENTS

| | | |
|---|---|---|
| 2012/0028661 A1 | 2/2012 | Fang et al. |
| 2012/0069731 A1 | 3/2012 | Tooher et al. |
| 2012/0115489 A1 | 5/2012 | Shuai et al. |
| 2012/0122459 A1 | 5/2012 | Wu et al. |
| 2012/0218889 A1 | 8/2012 | Watfa et al. |
| 2012/0302239 A1 | 11/2012 | Hu et al. |
| 2013/0017805 A1* | 1/2013 | Andre--Jonsson ........................ H04W 36/0066 455/411 |
| 2013/0034060 A1 | 2/2013 | Lu et al. |
| 2013/0034080 A1 | 2/2013 | Yang et al. |
| 2013/0039301 A1 | 2/2013 | Nishida et al. |
| 2013/0053036 A1 | 2/2013 | Gong et al. |
| 2013/0210466 A1 | 8/2013 | Arvidsson et al. |
| 2013/0260765 A1 | 10/2013 | Aoyagi et al. |
| 2013/0287007 A1 | 10/2013 | Wu et al. |
| 2013/0308527 A1 | 11/2013 | Chin et al. |
| 2014/0051443 A1 | 2/2014 | Diachina et al. |
| 2014/0146792 A1 | 5/2014 | André-Jönsson et al. |
| 2014/0235242 A1 | 8/2014 | Granzow et al. |

FOREIGN PATENT DOCUMENTS

| | | |
|---|---|---|
| CN | 102387560 A | 3/2012 |
| CN | 102404815 A | 4/2012 |
| EP | 2249608 A1 | 11/2010 |
| JP | 2005512432 A | 4/2005 |
| JP | 2010147576 A | 7/2010 |
| JP | 2012084988 A | 4/2012 |
| WO | WO 2011120030 A1 | 9/2011 |
| WO | WO 2011153546 A2 | 12/2011 |

OTHER PUBLICATIONS

"Roaming forwarding for CSFB: Avoid customer charging in old MSC," Change Request, SA WG2 Meeting #88, San Francisco, California, S2-115298(Nov. 14-18, 2011).

"Fast Return After CSFB," 3GPP TSG-SA WG2 Meeting #87, Jeju Island, South Korea, S2-11458, 3rd Generation Partnership Project, Valbonne, France (Oct. 10-14, 2011).

"3rd Generation Partnership Project; Technical Specification Group Services and System Aspects; Circuit Switched (CS) fall back in Evolved Packet System (EPS); Stage 2 (Release 11 )," 3GPP TS 23.272, V11.0.0, pp. 1-87, 3rd Generation Partnership Project, Valbonne, France (Mar. 2012).

"3rd Generation Partnership Project; Technical Specification Group Services and System Aspects; General Packet Radio Service (GPRS) enhancements for Evolved Universal Terrestrial Radio Access Network (E-UTRAN) access (Release 11 )," 3GPP TS 23.401, V11.1.0, pp. 1-284, 3rd Generation Partnership Project, Valbonne, France (Mar. 2012).

"3rd Generation Partnership Project; Technical Specification Group Core Network and Terminals; Non-Access-Stratum (NAS) protocol for Evolved Packet System (EPS); Stage 3 (Release 11 )," 3GPP TS 24.301, V11.2.1, pp. 1-327, 3rd Generation Partnership Project, Valbonne, France (Mar. 2012).

"3rd Generation Partnership Project; Technical Specification Group Radio Access Network; UTRAN lu interface Radio Access Network Application Part (RANAP) signalling (Release 1 O)," 3GPP TS 25.413, V10.5.0, pp. 1-428, 3rd Generation Partnership Project, Valbonne, France (Mar. 2012).

"3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11 )," 3GPP TS 29.27 4, V11.2.0, pp. 1-214, 3rd Generation Partnership Project, Valbonne, France (Mar. 2012).

"3$^{rd}$ Generation Partnership Project; Technical Specification Group Radio Access Network; Radio Resource Control (RRC); Protocol specification (Release 11)," 3GPP TS 25.331 V11.1.0, pp. 1-1911, 3$^{rd}$ Generation Partnership Project, Valbonne, France (Mar. 2012).

* cited by examiner

METHOD AND SYSTEM FOR RETURNING TO LONG TERM EVOLUTION NETWORK AND MOBILE SWITCHING CENTER

CROSS-REFERENCE TO RELATED APPLICATIONS

This application is a continuation of U.S. patent application Ser. No. 14/561,037, filed on Dec. 4, 2014, which is a continuation of International Application No. PCT/CN2012/076517, filed on Jun. 6, 2012. The afore-mentioned patent applications are hereby incorporated by reference in their entireties.

TECHNICAL FIELD

The present invention relates to communications, and in particular, to a method and a system for returning to a long term evolution network and a mobile switching center (Mobile Switching Center, MSC).

BACKGROUND

Circuit service (Circuit Service, CS) network is a wireless network for providing circuit service such as voice call and the like, and coverage of 2G/3G wireless networks such as a GSM, a WCDMA and the like is quite universal. Meanwhile, with development of network technology, packet service (Packet Service, PS) networks specialized in providing data service, such as long term evolution (Long Term Evolution, LTE), system architecture evolution (System Architecture Evolution, SAE), high-speed packet access (High-Speed Packet Access, HSPA), high-speed packet access evolution (High-Speed Packet Access Evolution, HSPA+) and so forth, also have broad coverage. Therefore, a CS network and a PS network coexist in a current communication network, and an operator may provide circuit service for a subscriber by using a 2G/3G network or provide data service for a subscriber by using an LTE network. A user equipment (User Equipment, UE) is a multi-mode terminal, and may perform circuit service in a CS network or perform data service in a PS network according to requirements of a subscriber.

For the moment, an MSC redirects all UEs to the LTE, thereby raising a problem that a UE which does not need to return to the LTE network mistakenly returns to the LTE network.

SUMMARY

Embodiments of the present invention provide a method, an MSC and a system for returning to a long term evolution network, which may prevent a UE which does not need to return to the LTE network from mistakenly returning to the LTE network.

To achieve the above-mentioned purpose, the embodiments of the present invention adopt the following technical solutions.

In one aspect, a method for returning to a long term evolution network is provided, including:

receiving, by a first mobile switching center (MSC), a first circuit service fall back (CSFB) indication corresponding to a user equipment (UE) that is sent by a mobility management entity (Mobility Management Entity, MME) after the UE initiates CSFB, wherein the first CSFB indication is used for identifying that the UE needs to return to a long term evolution (LTE) network after circuit service of the UE is finished; and sending, according to the first CSFB indication, a second CSFB indication corresponding to the UE to a radio network controller (Radio Network Controller, RNC)/base station controller (Base Station Controller, BSC) corresponding to the UE when the circuit service of the UE is finished, wherein the second CSFB indication is used for indicating that the RNC/BSC is to notify the UE of returning to the LTE network.

In another aspect, a method for returning to a long term evolution network is provided, including:

receiving, when a user equipment (UE) is accessed to a second mobile switching center (MSC) due to linking area updating (LAU), a first CSFB indication corresponding to the UE that is sent by a first MSC, wherein the first CSFB indication is sent from a mobility management entity (MME) to the first MSC, and is used for identifying that the UE needs to return to a long term evolution (LTE) network after circuit service of the UE is finished; and sending, according to the first CSFB indication, a second CSFB indication corresponding to the UE to a radio network controller (RNC)/base station controller (BSC) corresponding to the UE when the circuit service of the UE is finished, wherein the second CSFB indication is used for indicating that the RNC/BSC is to notify the UE of returning to the LTE network.

In another aspect, a method for returning to a long term evolution network is provided, including:

receiving a request message for initiating circuit service fall back (CSFB) by a user equipment (UE); and sending a first CSFB indication corresponding to the UE to a first mobile switching center (MSC), wherein the first CSFB indication is used for identifying that the UE needs to return to a long term evolution (LTE) network after circuit service of the UE is finished, so that the first MSC or a second MSC accessed by the UE due to linking area updating (LAU) sends, according to the received first CSFB indication, a second CSFB indication corresponding to the UE to a radio network controller (RNC)/base station controller (BSC) corresponding to the UE when the circuit service of the UE is finished, wherein the second CSFB indication is used for indicating that the RNC/BSC is to notify the UE of returning to the LTE network, and the second MSC receives the first CSFB indication sent by the first MSC.

In another aspect, a method for returning to a long term evolution network is provided, including:

receiving, when circuit service of a user equipment (UE) is finished, a notification of returning to a long term evolution (LTE) network that is sent by a radio network controller (RNC)/base station controller (BSC) corresponding to the UE, wherein the notification of returning to the LTE network includes a notification of returning to the LTE network, and the notification of returning to the LTE network is sent from the RNC/BSC to the UE after the RNC/BSC receives a second CSFB indication corresponding to the UE that is sent by a first mobile switching center (MSC) according to a first CSFB indication received from a mobility management entity (MME); and returning to the LTE network.

In another aspect, a mobile switching center (MSC) is provided, including:

a receiving unit, configured to receive a first circuit service fall back (CSFB) indication corresponding to a user equipment (UE) that is sent by a mobility management entity (MME) after the UE initiates CSFB, wherein the first CSFB indication is used for identifying that the UE needs to return to a long term evolution (LTE) network after circuit service of the UE is finished; and a first sending unit, configured to send, according to the first CSFB indication received by the receiving unit, a second CSFB indication corresponding to the UE to a radio network controller (RNC)/base station controller (BSC) corresponding to the UE when the circuit service of the UE is finished, wherein the second CSFB indication is used for indicating that the RNC/BSC is to notify the UE of returning to the LTE network.

In another aspect, a mobile switching center (MSC) is provided, including:

an acquiring unit, configured to receive, when a user equipment (UE) is accessed to the MSC due to linking area updating (LAU), a first CSFB indication corresponding to the UE that is sent by another MSC, wherein the first CSFB indication is sent from a mobility management entity (MME) to the another MSC, and is used for identifying that the UE needs to return to a long term evolution (LTE) network after circuit service of the UE is finished; and a sending unit, configured to send, according to the first CSFB indication received by the acquiring unit, a second CSFB indication corresponding to the UE to a radio network controller (RNC)/base station controller (BSC) corresponding to the UE when the circuit service of the UE is finished, wherein the second CSFB indication is used for indicating that the RNC/BSC is to notify the UE of returning to the LTE network.

In another aspect, a mobility management entity (MME) is provided, including:

a receiving unit, configured to receive a request message for initiating circuit service fall back (CSFB) by a user equipment (UE); and a sending unit, configured to send a first CSFB indication corresponding to the UE to a mobile switching center (MSC), wherein the first CSFB indication is used for identifying that the UE needs to return to a long term evolution (LTE) network after circuit service of the UE is finished, so that the MSC or another MSC accessed by the UE due to linking area updating (LAU) sends, according to the first CSFB indication, a second CSFB indication corresponding to the UE to a radio network controller (RNC)/base station controller (BSC) corresponding to the UE when the circuit service of the UE is finished, wherein the second CSFB indication is used for indicating that the RNC/BSC is to notify the UE of returning to the LTE network, wherein the another MSC receives the first CSFB indication sent by the MSC.

In another aspect, a user equipment (UE) is provided, including:

a receiving unit, configured to receive, when circuit service of the UE is finished, a notification of returning to a long term evolution (LTE) network that is sent by a radio network controller (RNC)/base station controller (BSC) corresponding to the UE, wherein the notification of returning to the LTE network includes a notification of returning to the LTE network, and the notification of returning to the LTE network is sent from the RNC/BSC to the UE after the RNC/BSC receives a second CSFB indication corresponding to the UE that is sent by a first mobile switching center (MSC) according to a first CSFB indication received from a mobility management entity (MME); and an executing unit, configured to return to the LTE network after the receiving unit receives the notification of returning to the long term evolution (LTE) network sent by the RNC/BSC.

In another aspect, a system of returning to a long term evolution network is provided, including a first MSC, an MME, a UE and an RNC/BSC corresponding to the UE; wherein the first MSC is configured to receive a first CSFB indication corresponding to the UE that is sent by the mobility management entity (MME) after the user equipment (UE) initiates circuit service fall back (CSFB), the first CSFB indication being used for identifying that the UE needs to return to a long term evolution (LTE) network after circuit service of the UE is finished; and send, according to the first CSFB indication, a second CSFB indication corresponding to the UE to the radio network controller (RNC)/base station controller (BSC) corresponding to the UE when the circuit service of the UE is finished, the second CSFB indication being used for indicating that the RNC/BSC is to notify the UE of returning to the LTE network;

the MME is configured to receive a request message for initiating circuit service fall back (CSFB) by the UE, and send the first CSFB indication corresponding to the UE to the first MSC;

the RNC/BSC is configured to receive the second CSFB indication corresponding to the UE that is sent by the first MSC, and notify the UE of returning to the LTE network; and the UE is configured to initiate a CSFB request to the MME, and receive a notification of returning to the long term evolution (LTE) network sent by the RNC/BSC when the circuit service of the UE is finished.

According to the method, the MSC and the system for returning to the LTE network provided by the embodiments of the present invention, the first MSC receives the first CSFB indication sent by the MME before a CSFB flow is executed, such that the first MSC may distinguish whether a UE needs to return to the LTE network after circuit service of the UE is finished, and thus only a UE with CSFB is notified of returning to the LTE network. Compared with an existing technology in which any UE is instructed to return to the LTE network after circuit service of the UE is finished, the first MSC may distinguish a UE of which circuit service is aroused by CSFB, thereby avoiding a UE which does not need to return to the LTE network from mistakenly returning to the LTE network.

BRIEF DESCRIPTION OF DRAWINGS

To illustrate the technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other drawings may be obtained by those of ordinary skill in the art without any creative effort.

DESCRIPTION OF EMBODIMENTS

The technical solutions in the embodiments of the present invention will be described clearly and fully hereinafter in conjunction with the accompanying drawings in the embodiments of the present invention. Obviously, the embodiments described are merely a part, but not all, of the embodiments of the present invention. All of other embodiments, obtained by those of ordinary skill in the art based on the embodiments of the present invention without any creative effort, fall into the protection scope of the present invention.

For most of UEs, an LTE signal and a 2G/3G signal cannot be simultaneously transceived conerning implementation complexity and cost. For example, when a UE performs data service or is in an idle state in an LTE network, if the UE wants to initiate or receive circuit service (including a voice call, a supplementary service, a locating service and the like), circuit service fall back (Circuit Service Fall Back, CSFB) flow needs to be executed, and a wireless module of the UE falls back from LTE to 2G/3G, so that the UE completes the circuit service in a 2G/3G network. After the circuit service is finished (finish of the circuit service is equivalent to releasing a 2G/3G wireless connection of the UE), a terminal needs to return to the LTE network, so as to continue to perform the data service in the LTE.

At present, since an MSC can not accurately learn whether circuit services of respective UEs are aroused by CSFB, the MSC redirect all the UEs to the LTE, thereby raising a problem that a UE which does not need to return to the LTE network mistakenly returns to the LTE network.

To solve the above-mentioned technical problem, the present invention provides the following technical solutions.

Figure 1:
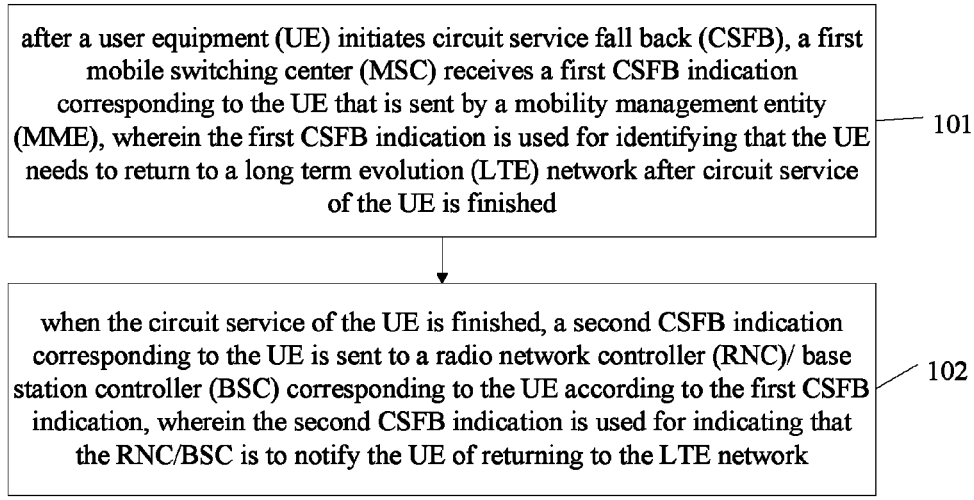
FIG. 1 is a flow diagram of a method for returning to an LTE network in an embodiment of the present invention.

An embodiment of the present invention provides a method for returning to an LTE network. As shown in FIG. 1, the method includes the following steps.

101, after a user equipment (UE) initiates circuit service fall back (CSFB), a first mobile switching center (MSC) receives a first CSFB indication corresponding to the UE that is sent by a mobility management entity (MME), wherein the first CSFB indication is used for identifying that the UE needs to return to a long term evolution (LTE) network after circuit service of the UE is finished.

The first CSFB indication may be carried in a first CSFB notification message, and the first CSFB notification message carries the first CSFB indication and a UE identification corresponding to the UE (namely the UE which initiates the CSFB). The MME sends the first CSFB indication to the first MSC, and the first CSFB indication is used for notifying the first MSC that, the circuit service to be performed by the UE is aroused by the CSFB, and the UE may be notified of returning to the LTE network after the circuit service is finished.

The first CSFB notification message may specifically be a service request message between the MME and the first MSC, such as, for example, an SGs-service request (SGs-service request) message, wherein SGs is an interface for co-registration between the MME and the MSC, and the SGs-service request message is a service request message transmitted through the SGs interface. Or, the first CSFB notification message may be a customrized CSFB notification message, which is obtained by, for example, expanding a network protocol.

102, when the circuit service of the UE is finished, a second CSFB indication corresponding to the UE is sent to a radio network controller (RNC)/base station controller (BSC) corresponding to the UE according to the first CSFB indication, wherein the second CSFB indication is used for indicating that the RNC/BSC is to notify the UE of returning to the LTE network.

Finish of the circuit service means release of a 2G/3G wireless connection of the UE. If the first MSC provides circuit service for the UE, after the circuit service is finished, the first MSC may trigger the RNC/BSC corresponding to the UE to notify the UE of returning to the LTE network. If the UE is accessed to a second MSC after the CSFB is initiated, the first MSC can not provide circuit service for the UE, and circuit service is provided to the UE by the second MSC. For example, in a linking area updating (Linking Area Updating, LAU) scenario, the UE moves and is connected to the second MSC, then the first MSC may send the CSFB indication to the second MSC which provides service for the UE, and the second MSC notifies the RNC/BSC corresponding to the UE after the circuit service is finished, so that the RNC/BSC notifies the UE of returning to the LTE network.

According to the method for returning to the LTE network provided by the embodiment of the present invention, the first MSC receives the first CSFB indication sent by the MME before a CSFB flow is executed, such that the first MSC may distinguish whether the circuit service of the UE is aroused by CSFB, and thus only a UE with CSFB is notified of returning to the LTE network. Compared with an existing technology in which any UE is instructed to return to the LTE network after circuit service of the UE is finished, the first MSC may distinguish a UE of which circuit service is aroused by the CSFB, thereby avoiding a UE which does not need to return to the LTE network from mistakenly returning to the LTE network.

Figure 2:
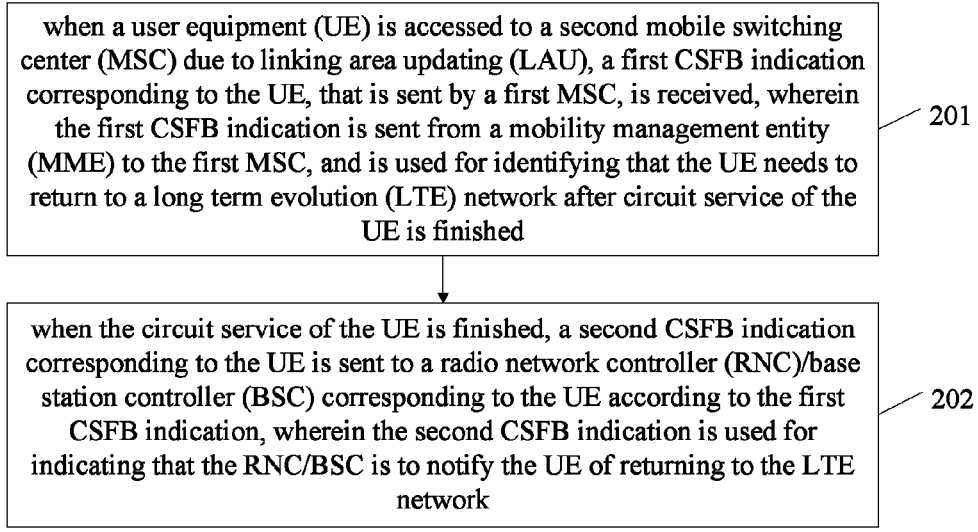
FIG. 2 is a flow diagram of a method for returning to an LTE network in another embodiment of the present invention.

Another embodiment of the present invention provides a method for returning to an LTE network. As shown in FIG. 2, the method includes the following steps.

201, when a user equipment (UE) is accessed to a second mobile switching center (MSC) due to linking area updating (LAU), a first CSFB indication corresponding to the UE, that is sent by a first MSC, is received, wherein the first CSFB indication is sent from a mobility management entity (MME) to the first MSC, and is used for identifying that the UE needs to return to a long term evolution (LTE) network after circuit service of the UE is finished.

If the UE is accessed to the second MSC due to LAU, the second MSC may provide circuit service for the UE. In order to learn whether the circuit service of the UE is aroused by CSFB, the second MSC may acquire the first CSFB indication from the first MSC. The first CSFB indication is used for identifying that the UE needs to return to the LTE network after the circuit service of the UE is finished.

202, when the circuit service of the UE is finished, a second CSFB indication corresponding to the UE is sent to a radio network controller (RNC)/base station controller (BSC) corresponding to the UE according to the first CSFB indication, wherein the second CSFB indication is used for indicating that the RNC/BSC is to notify the UE of returning to the LTE network.

According to the method for returning to the LTE network provided by another embodiment of the present invention, since the first MSC receives the first CSFB indication sent by the MME before a CSFB flow is executed, when the second MSC provides circuit service after LAU occurs at the UE, the second MSC may receive the first CSFB indication sent by the first MSC, so that the second MSC may distinguish the UE of which circuit service is aroused by the CSFB, and thus a UE which does not need to return to the LTE network may be prevented from mistakenly returning to the LTE network when LAU occurs.

Figure 3:
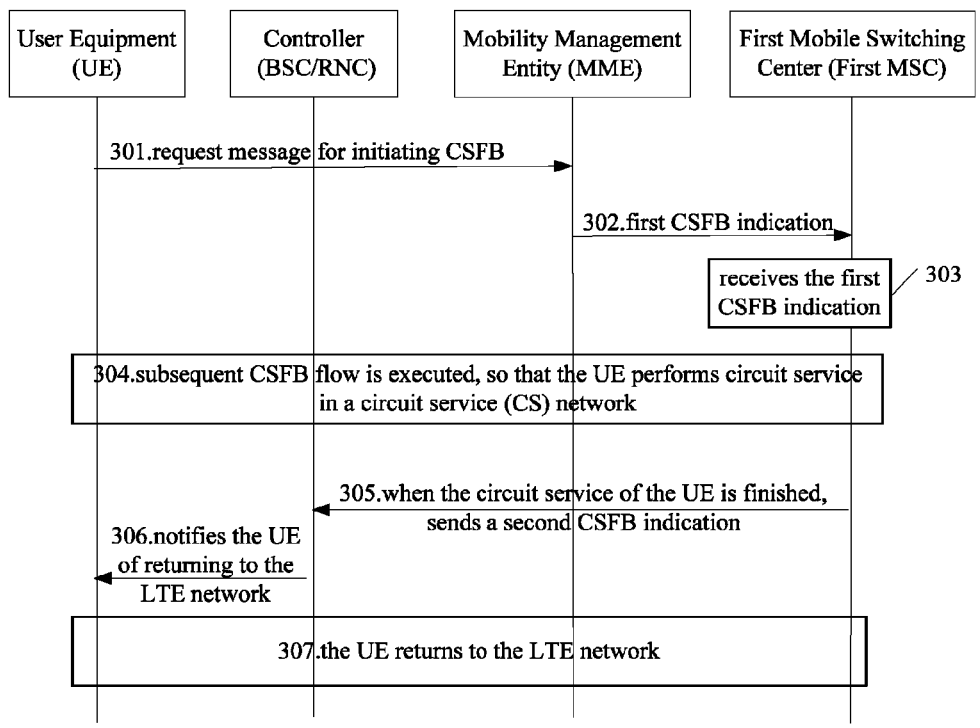
FIG. 3 is a flow diagram of a method for returning to an LTE network in another embodiment of the present invention.

Another embodiment of the present invention provides a method for returning to an LTE network. As shown in FIG. 3, the method includes the following steps.

301, a UE sends a request message for initiating circuit service fall back (CSFB) to an MME.

The request message for initiating circuit service fall back (CSFB) may be an extended service request (extended service request) message.

302, the MME sends a first CSFB indication to a first MSC, wherein the first CSFB indication is used for identifying that the UE needs to return to a long term evolution (LTE) network after circuit service of the UE is finished.

303, the first MSC receives the first CSFB indication sent by the MME.

The first CSFB indication may be carried in a first CSFB notification message, and a UE identification and the first CSFB indication, which are carried in the first CSFB notification message, are acquired. It may be determined that the circuit service of the UE corresponding to the UE identification is aroused by CSFB according to the UE identification and the first CSFB indication.

Further, circuit service of the UE being aroused by the CSFB is intended to mean that the UE, which is originally in the LTE network, falls back to a CS network to perform circuit service. If the UE is in the CS network before the circuit service is performed, the circuit service is not aroused by CSFB, the MME will not send the first CSFB indication to the first MSC, and the UE does not need to return to the LTE network after the circuit service is finished.

304, subsequent CSFB flow is executed, so that the UE performs circuit service in a circuit service (CS) network.

The CS network may be a GSM, a WCDMA, or other wireless communication network capable of providing circuit service. The circuit service may include a voice call service, a supplementary service, a locating service and the like. In the embodiment of the present invention, the UE accesses the first MSC after the UE falls back to the CS network, and the first MSC provides circuit service for the UE. It should be noted that, the first MSC may be selected for the UE by an MME when the UE accesses the MME, and the MME notifies the UE of relevant identification information of the selected first MSC. When the UE needs to perform the CSFB flow, the UE may be defaulty accessed to the first MSC.

305, when the circuit service of the UE is finished, the first MSC sends a second CSFB indication corresponding to the UE to an RNC/BSC corresponding to the UE.

It may be appreciated that, if the circuit service of the UE is not aroused by CSFB, the first MSC may not send the second CSFB indication corresponding to the UE to the RNC/BSC corresponding to the UE.

An access network control node corresponding to the UE may be a base station controller (Base Station Controller, BSC), a radio network controller (Radio Network Controller, RNC) or the like. The UE may send a terminal on-hook command to the first MSC, or an MSC at an opposite end sends a terminal on-hook command to the first MSC, or other command is utilized to enable the first MSC to judge that the circuit service of the UE is finished.

The second CSFB indication may be carried in a second CSFB notification message. For example, the second CSFB notification message may include a UE identification corresponding to the UE which needs to return to the LTE network, the second CSFB indication, other indication of returning to the LTE network or the like, and the second CSFB notification message is used for notifying the RNC/BSC of notifying the UE of returning to the LTE network and executing subsequent flow enabling the UE to return to the LTE network. It may be appreciated that if the first MSC can not directly communicate with the RNC/BSC corresponding to the UE, the second CSFB indication may be forwarded by an intermediate device.

306, the RNC/BSC corresponding to the UE notifies the UE of returning to the LTE network.

The RNC/BSC sends a notification of returning to the LTE network to the UE, so as to notify the UE of returning to the LTE network.

307, the UE returns to the LTE network.

After the UE receives the notification of returning to the LTE network, which is sent by the RNC/BSC through step 306, the UE executes subsequent flow for returning to the LTE network. After the UE returns to the LTE network, the UE may continue to perform data service.

According to the method for returning to the LTE network provided by the embodiment of the present invention, the first MSC receives the first CSFB indication sent by the MME before a CSFB flow is executed, such that the first MSC may distinguish whether a UE needs to return to the LTE network after circuit service of the UE is finished, and thus only a UE with CSFB is notified of returning to the LTE network. Compared with an existing technology in which any UE is instructed to return to the LTE network after circuit service of the UE is finished, the first MSC may distinguish a UE of which circuit service is aroused by CSFB, thereby avoiding a UE which does not need to return to the LTE network from mistakenly returning to the LTE network.

Figure 4:
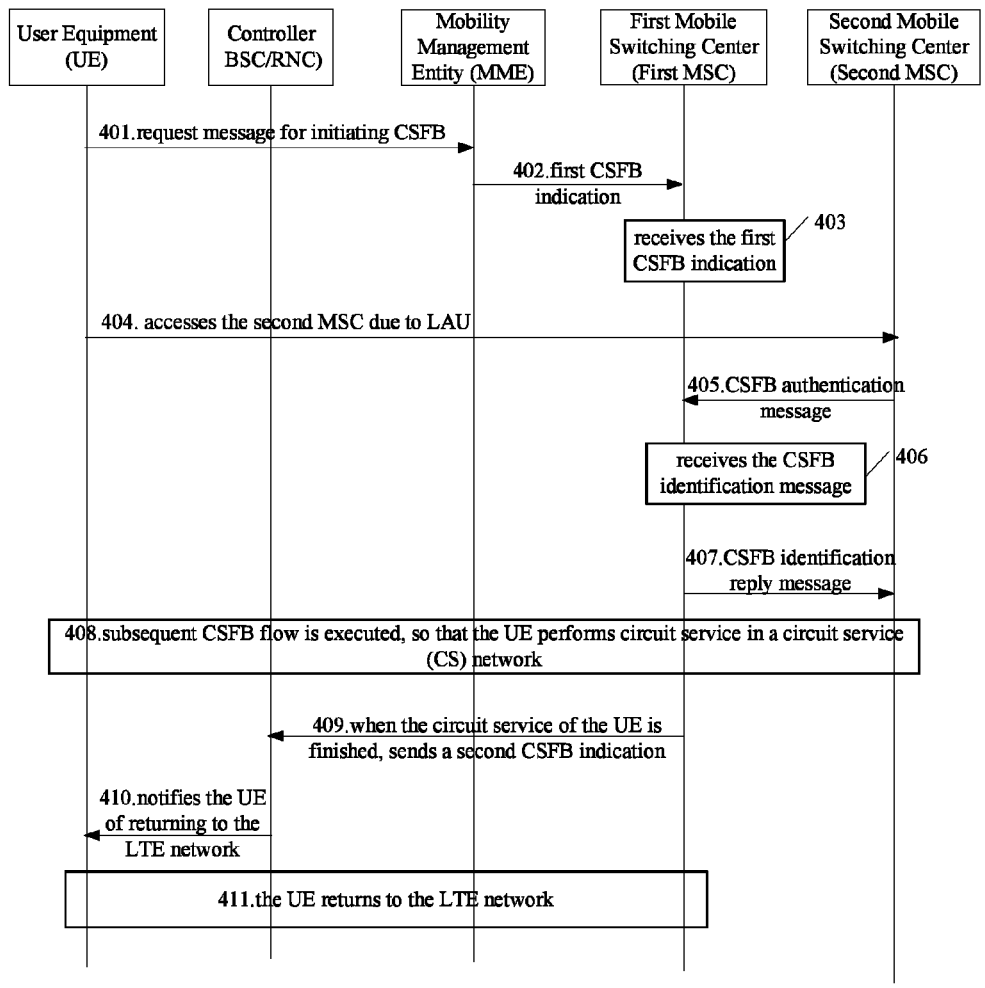
FIG. 4 is a flow diagram of a method for returning to an LTE network in another embodiment of the present invention.

In another implementation scenario of the embodiment of the present invention, a linking area (Linking Area, LA) of a UE is changed and thus the UE switches to a second MSC. Insteading providing circuit service to the UE by a first MSC which is selected for the UE by an MME, the circuit service is provided to the UE by the second MSC. Therefore, the embodiment of the present invention provides a method for returning to an LTE network. As shown in FIG. 4, the method includes the following steps.

steps 401-403 are similar to steps 301-303, and a difference lies in that the first MSC does not provide the circuit service for the UE. Subsequent flow is as follows.

404, the UE accesses a second MSC due to LAU.

The UE is accessed to the second MSC due to LAU. In order to distinguish whether the circuit service of the UE is aroused by CSFB, the second MSC may acquire the first CSFB indication corresponding to the UE from the first MSC.

405, the second MSC sends a CSFB identification message (send identification message) to the first MSC.

As the first MSC is a CS access point selected for the UE by the MME, the MME may notify the UE of identification information of the first MSC before a CSFB flow begins. As a result, before the second MSC sends the CSFB identification message to the first MSC, the UE may send an LAU request message carrying the identification information of the first MSC to the second MSC, so that the second MSC identifies the first MSC according to the identification information of the first MSC and sends the CSFB identification message to the first MSC.

406, the first MSC receives the CSFB identification message sent by the second MSC.

Specifically, a method for acquiring the CSFB indication by the second MSC may be as follows: the second MSC sends the CSFB identification message to the first MSC, and if the first MSC receives the first CSFB indication in step 401, a CSFB identification reply message carries the first CSFB indication.

Or, a method for acquiring the CSFB indication by the second MSC may be as follows: the CSFB identification message carries an identification dedicated parameter for indicating that the first MSC is to provide an CSFB indication, and the CSFB identification reply message carries the first CSFB indication only when the first MSC obtains the identification dedicated parameter through parsing. Or, the second MSC may acquire the first CSFB indication through other specific message.

407, the first MSC sends a CSFB identification reply message according to the first CSFB indication corresponding to the UE that is sent by the MME.

When the first MSC receives the CSFB identification message, the first MSC may query whether the first CSFB indication sent by the MME is received. If the first MSC receives the first CSFB indication sent by the MME, the first CSFB indication is carried in the CSFB identification reply message and sent to the second MSC. If the first MSC does not receive the first CSFB notification message sent by the MME, or the first CSFB notification message does not carry the first CSFB indication, the first MSC may reply the CSFB identification message withnot carrying the CSFB indication.

Or, after the first MSC receives the CSFB identification message sent by the second MSC, if the CSFB identification message includes an identification dedicated parameter, then the first MSC queries whether the first CSFB notification message sent by the MME is received and performs subsequent reply operation of the CSFB identification message. Wherein the identification dedicated parameter is used for indicating that the first MSC is to provide the first CSFB indication.

408, subsequent CSFB flow is executed, so that the UE performs circuit service in a circuit service (CS) network.

It should be noted that, in a CSFB flow, the UE may interact with the MME, the MSC or the RNC/BSC for multiple times, which is not described in detail in the embodiment of the present invention.

409, when the circuit service of the UE is finished, the second MSC sends a second CSFB indication corresponding to the UE to the RNC/BSC corresponding to the UE.

The second CSFB indication is used for notifying the RNC/BSC that the UE needs to return to the LTE network, so that the RNC/BSC notifies the UE of returning to the LTE network.

410, the RNC/BSC corresponding to the UE notifies the UE of returning to the LTE network.

After the RNC/BSC receives the second CSFB indication corresponding to the UE that is sent by the second MSC through step 409, the RNC/BSC sends a notification of returning to the LTE network to the UE, so as to notify the UE of returning to the LTE network.

411, the UE returns to the long term evolution (LTE) network.

After the UE returns to the LTE network, the UE may continue data service in the LTE network.

It should be noted that, the second MSC and the first MSC mean that the MME selects the first MSC for the UE and the UE probably switches from the first MSC to the second MSC after CSFB. A same MSC device may simultaneously have functionalities of the first MSC and the second MSC. That is to say, when the UE performs circuit service in a certain MSC, if the MSC is the first MSC selected by the MME, the MSC may receive the first CSFB indication sent by the MME; and if the MSC is the second MSC accessed by the UE due to LAU, the MSC may receive the first CSFB indication corresponding to the UE that is sent from the first MSC. For specific description of part of the steps in the embodiment of the present invention, reference may be made to corresponding contents in other embodiment, and will not be redundantly described herein in the embodiment of the present invention.

The first MSC receives the first CSFB indication sent by the MME before a CSFB flow is executed, such that the first MSC may distinguish whether a UE needs to return to the LTE network after circuit service of the UE is finished, and thus only a UE with CSFB is notified of returning to the LTE network. Compared with an existing technology in which any UE is instructed to return to the LTE network after circuit service of the UE is finished, the first MSC may distinguish a UE of which circuit service is aroused by CSFB, thereby avoiding a UE which does not need to return to the LTE network from mistakenly returning to the LTE network.

Moreover, when the second MSC provides circuit service after LAU occurs at the UE, the second MSC may receive the first CSFB indication sent by the first MSC, so that the second MSC may distinguish a UE of which circuit service is aroused by CSFB, and a UE which does not need to return to the LTE network may be prevented from mistakenly returning to the LTE network when LAU occurs.

Figure 5:
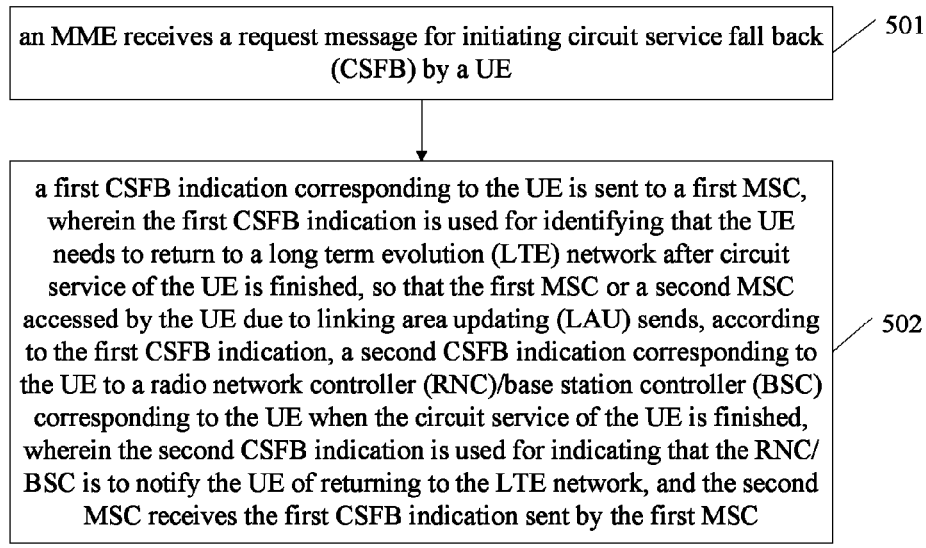
FIG. 5 is a flow diagram of a method for returning to an LTE network in another embodiment of the present invention.

Another embodiment of the present invention provides a method for returning to a long term evolution network, which may be applied to an MME side. As shown in FIG. 5, the method includes the following steps.

501, an MME receives a request message for initiating circuit service fall back (CSFB) by a UE.

The request message for initiating circuit service fall back (CSFB) may be an extended service request message, and is used for initiating circuit service fall back (CSFB).

There are two scenarios where the UE initiates CSFB. One scenario is that the UE performs data service or is in an idle state in the LTE network, and wants to initiate a (CS) circuit service. In this case, the UE executes a CSFB flow to switch a wireless module of the UE from LTE to 2G/3G, and initiates circuit service in a 2G/3G network. Such a scenario is referred to as a call initiated by the UE (mobile originating call). The other scenario is that the UE performs data service or is in an idle state in the LTE network, and the UE receives circuit service of another UE. In this case, the LTE network notifies the UE of arrival of the circuit service, and the UE executes a CSFB flow to switch a wireless module to 2G/3G, and receives the circuit service in a 2G/3G network. Such a scenario is referred to as an terminating call of the UE (mobile terminating call). In both of the two scenarios, the UE may initiate CSFB through an extended service request message, which is applicable to different embodiments of the present invention.

502, a first CSFB indication corresponding to the UE is sent to a first MSC, wherein the first CSFB indication is used for identifying that the UE needs to return to a long term evolution (LTE) network after circuit service of the UE is finished, so that the first MSC or a second MSC accessed by the UE due to linking area updating (LAU) sends, according to the first CSFB indication, a second CSFB indication corresponding to the UE to a radio network controller (RNC)/base station controller (BSC) corresponding to the UE when the circuit service of the UE is finished, wherein the second CSFB indication is used for indicating that the RNC/BSC is to notify the UE of returning to the LTE network, and the second MSC receives the first CSFB indication sent by the first MSC.

The first CSFB indication is carried in a service request message between the MME and the first MSC, such as, for example, an SGs-service request message, or carried in a customrized CSFB notification message.

In the embodiment of the present invention, when the UE initiates CSFB, the MME sends the first CSFB indication to the first MSC. On the contrary, if the UE directly performs circuit service in an MSC, the operation of sending the first CSFB indication to the first MSC by the MME is not triggered. Therefore, the MSC may not execute relevant operation of enabling the UE to return to the LTE network after the circuit service of the UE is finished, and the UE may remain in the CS network. For specific description of part of the steps in the embodiment of the present invention, reference may be made to corresponding contents in other embodiments, and will not be redundantly described herein in the embodiment of the present invention.

According to the method for returning to the LTE network provided by the embodiment of the present invention, the first MSC receives the first CSFB indication sent by the MME before a CSFB flow is executed, such that the first MSC may distinguish whether a UE needs to return to the LTE network after circuit service of the UE is finished, and thus only a UE with CSFB is notified of returning to the LTE network. Compared with an existing technology in which any UE is instructed to return to the LTE network after circuit service of the UE is finished, the first MSC may distinguish a UE of which circuit service is aroused by CSFB, thereby avoiding a UE which does not need to return to the LTE network from mistakenly returning to the LTE network.

Figure 6:
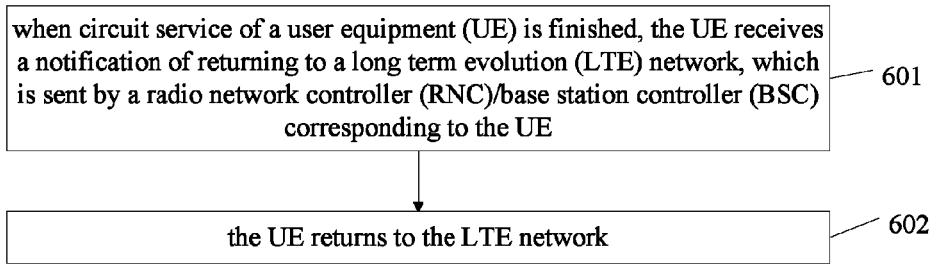
FIG. 6 is a flow diagram of a method for returning to an LTE network in another embodiment of the present invention.

Another embodiment of the present invention also provides a method for returning to a long term evolution network, which may be applied to a UE side. As shown in FIG. 6, the method includes the following steps.

601, when circuit service of a user equipment (UE) is finished, the UE receives a notification of returning to a long term evolution (LTE) network, which is sent by a radio network controller (RNC)/base station controller (BSC) corresponding to the UE.

The notification of returning to the LTE network includes a notification of returning to the LTE network, which is sent from the RNC/BSC to the UE after the RNC/BSC receives a second CSFB indication corresponding to the UE that is sent by a first mobile switching center (MSC) according to a first CSFB indication received from a mobility management entity (MME).

602, the UE returns to the LTE network.

In another application scenario of the embodiment of the present invention, the notification of returning to the LTE network further includes a notification of returning to the LTE network sent from the RNC/BSC to the UE after the RNC/BSC receives the second CSFB indication corresponding to the UE that is sent by the second MSC according to the first CSFB indication received from the first MSC.

According to the method for returning to the LTE network provided by the embodiment of the present invention, the first MSC receives the first CSFB indication sent by the MME before a CSFB flow is executed, such that the first MSC may distinguish whether the circuit service of the UE is aroused by CSFB, and thus only a UE with CSFB is notified of returning to the LTE network. Compared with an existing technology in which any UE is instructed to return to the LTE network after circuit service of the UE is finished, the first MSC may distinguish a UE of which circuit service is aroused by the CSFB, thereby avoiding a UE which does not need to return to the LTE network from mistakenly returning to the LTE network.

Figure 7:
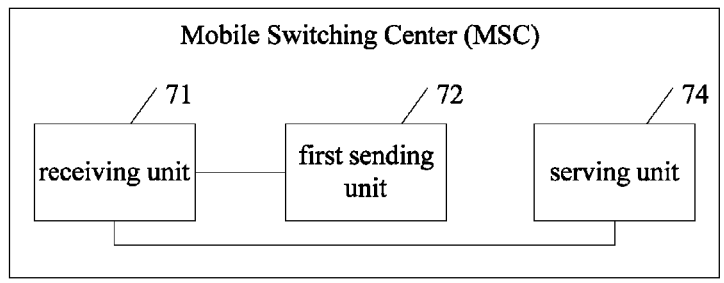
FIG. 7 is a schematic diagram of an arrangement of an MSC in another embodiment of the present invention.

Another embodiment of the present invention further provides an MSC, which is used for executing the above-mentioned method for returning to the LTE network. As shown in FIG. 7, the MSC includes a receiving unit 71 and a first sending unit 72.

The receiving unit 71 is configured to receive a first circuit service fall back (CSFB) indication corresponding to a user equipment (UE) that is sent by a mobility management entity (MME) after the UE initiates CSFB, wherein the first CSFB indication is used for identifying that the UE needs to return to a long term evolution (LTE) network after circuit service of the UE is finished.

The first CSFB indication received by the receiving unit 71 may be carried in a service request message between the MME and the MSC, or carried in a customrized CSFB notification message.

The first sending unit 72 is configured to send, according to the first CSFB indication received by the receiving unit, a second CSFB indication corresponding to the UE to a radio network controller (RNC)/base station controller (BSC) corresponding to the UE when the circuit service of the UE is finished, wherein the second CSFB indication is used for indicating that the RNC/BSC is to notify the UE of returning to the LTE network.

Further, the MSC may further include a serving unit 74.

The serving unit 74 is configured to execute subsequent CSFB flow after the receiving unit 71 receives the first CSFB indication corresponding to the UE that is sent by the mobility management entity (MME), so that the UE performs circuit service in a circuit service (CS) network.

The UE is switched to another MSC due to change of LA, and circuit service is provided to the UE by the another MSC rather than the above-mentioned MSC selected for the UE by the MME.

Figure 8:
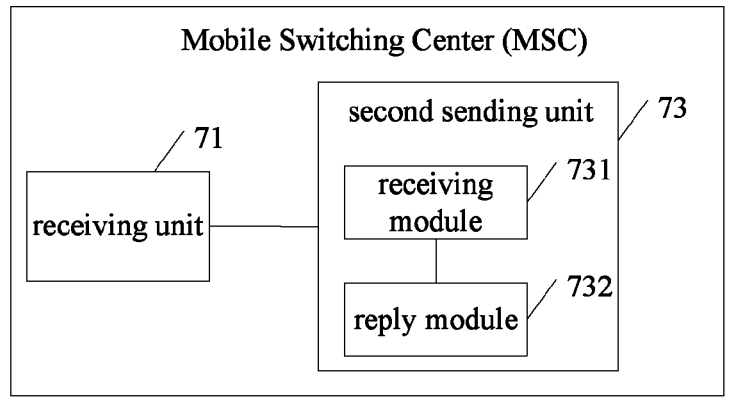
FIG. 8 is a schematic diagram of an arrangement of an MSC in another embodiment of the present invention.

Further, optionally, in another application scenario of the embodiment of the present invention, as shown in FIG. 8, the MSC may further include a second sending unit 73.

The second sending unit 73 is configured to send the first CSFB indication to another MSC if the UE is accessed to the another MSC due to linking area updating (LAU), so as for the another MSC to send, according to the first CSFB indication, the second CSFB indication corresponding to the UE to the radio network controller (RNC)/base station controller (BSC) corresponding to the UE when the circuit service of the UE is finished, and the second CSFB is used for indicating that the RNC/BSC is to notify the UE of returning to the LTE network.

Further, the second sending unit 73 includes a receiving module 731 and a reply module 732.

The receiving module 731 is configured to receive a CSFB identification message sent by the another MSC.

The reply module 732 is configured to send a CSFB identification reply message according to the first CSFB indication corresponding to the UE that is sent by the MME, wherein the CSFB identification reply message carries the first CSFB indication.

The CSFB identification message received by the receiving module 731 may carry an identification dedicated parameter, and the identification dedicated parameter is used for indicating that the MSC is to provide the first CSFB indication.

The first MSC in the another embodiment of the present invention mentioned above may be realized by the MSC provided by the present embodiment; and the second MSC in the another embodiment of the present invention mentioned above may be realized by the another MSC provided by the present embodiment.

Figure 9:
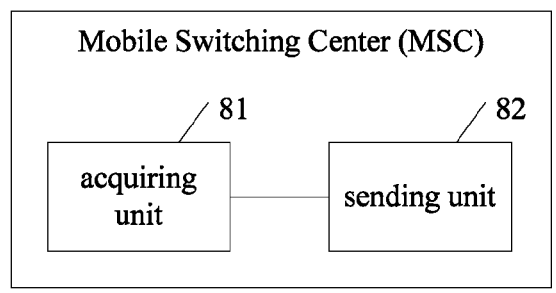
FIG. 9 is a schematic diagram of an arrangement of an MSC in another embodiment of the present invention.

Another embodiment of the present invention further provides an MSC. As shown in FIG. 9, the MSC includes an acquiring unit 81 and a sending unit 82.

The acquiring unit 81 is configured to receive, when a user equipment (UE) is accessed to the MSC due to linking area updating (LAU), a first CSFB indication corresponding to the UE that is sent by another MSC, wherein the first CSFB indication is sent from a mobility management entity (MME) to the another MSC, and is used for identifying that the UE needs to return to the long term evolution (LTE) network after circuit service of the UE is finished.

The sending unit 82 is configured to send, according to the first CSFB indication acquired by the acquiring unit 81, a second CSFB indication corresponding to the UE to a radio network controller (RNC)/base station controller (BSC) corresponding to the UE when the circuit service of the UE is finished, wherein the second CSFB indication is used for indicating that the RNC/BSC is to notify the UE of returning to the LTE network.

Figure 10:
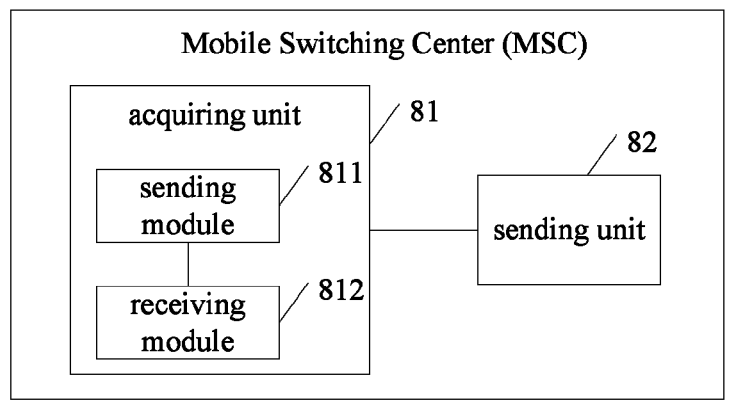
FIG. 10 is a schematic diagram of an arrangement of an MSC in another embodiment of the present invention.

Further, as shown in FIG. 10, the acquiring unit 81 may include a sending module 811 and a receiving module 812.

The sending module 811 is configured to send a circuit service fall back (CSFB) identification message to the another MSC after the UE is accessed to the MSC due to linking area updating (LAU).

The receiving module 812 is configured to receive a CSFB identification reply message sent by the another MSC, wherein the CSFB identification reply message carries the first CSFB indication.

The first MSC in the another embodiment of the present invention mentioned above may be realized by the another MSC provided by the present embodiment, and the second MSC in the another embodiment of the present invention mentioned above may be realized by the MSC provided by the present embodiment.

Figure 11:
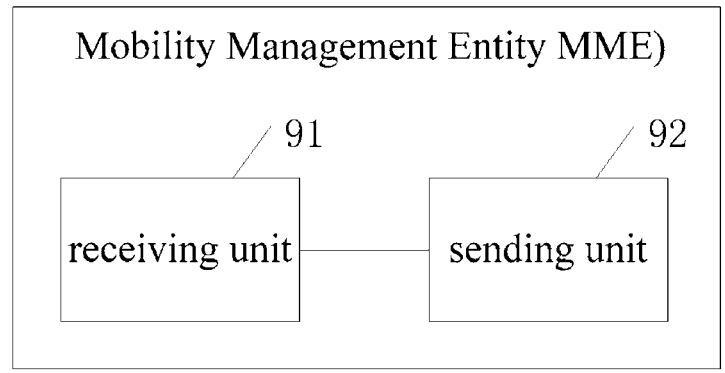
FIG. 11 is a schematic diagram of an arrangement of an MME in another embodiment of the present invention.

Another embodiment of the present invention further provides an MME. As shown in FIG. 11, the MME includes a receiving unit 91 and a sending unit 92.

The receiving unit 91 is configured to receive a request message for initiating circuit service fall back (CSFB) by a user equipment (UE).

The sending unit 92 is configured to send, after the receiving unit 91 receives the request message for CSFB, a first CSFB indication corresponding to the UE to a mobile switching center (MSC), wherein the first CSFB indication is used for identifying that the UE needs to return to a long term evolution (LTE) network after circuit service of the UE is finished, so that the MSC or another MSC accessed by the UE due to linking area updating (LAU) sends, according to the first CSFB indication, a second CSFB indication corresponding to the UE to a radio network controller (RNC)/ base station controller (BSC) corresponding to the UE when the circuit service of the UE is finished, wherein the second CSFB indication is used for indicating that the RNC/BSC is to notify the UE of returning to the LTE network, and the another MSC receives the first CSFB indication sent by the MSC.

Before the receiving unit 91 receives the request message for initiating CSFB sent by the UE, the MME already selects an MSC for the UE and sends identification information of the MSC to the UE, so that, when the UE performs linking area updating (LAU), the identification information of the MSC is written into an LAU message and sent to the another MSC.

The first MSC in the another embodiment of the present invention mentioned above may be realized by the MSC described in the present embodiment; and the second MSC in the another embodiment of the present invention mentioned above may be realized by the another MSC described in the present embodiment.

Figure 12:
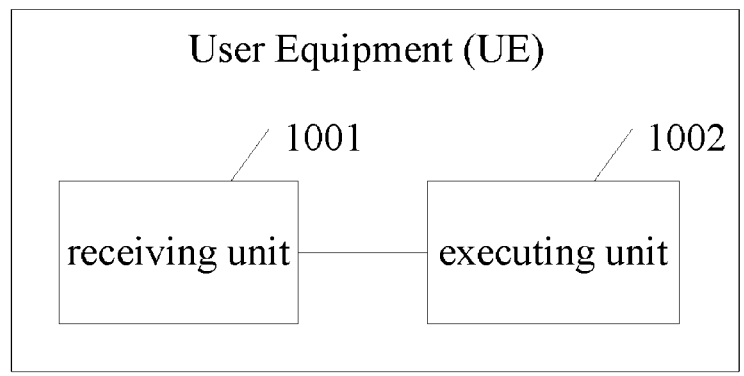
FIG. 12 is a schematic diagram of an arrangement of a UE in another embodiment of the present invention.

Another embodiment of the present invention further provides a UE. As shown in FIG. 12, the UE includes a receiving unit 1001 and an executing unit 1002.

The receiving unit 1001 is configured to receive, when circuit service of the UE is finished, a notification of returning to a long term evolution (LTE) network sent by a radio network controller (RNC)/base station controller (BSC) corresponding to the UE.

The notification of returning to the LTE network includes a notification of returning to the LTE network, which is sent from the RNC/BSC to the UE after the RNC/BSC receives a second CSFB indication corresponding to the UE that is sent by a first mobile switching center (MSC) according to a first CSFB indication sent by an MME.

The executing unit 1002 is configured to return to the LTE network after the receiving unit 1001 receives the notification of returning to the long term evolution (LTE) network sent by the RNC/BSC.

Further, optionally, the notification of returning to the LTE network may further include a notification of returning to the LTE network sent from the RNC/BSC to the UE after the RNC/BSC receives a second CSFB indication sent by a second MSC according to the first CSFB indication received from the first MSC.

An embodiment of the present invention further provides a system for returning to an LTE network. Reference may be made to an architecture shown in FIG. 3, and the system includes an MSC, an MME, a UE and an RNC/BSC corresponding to the UE.

The MSC is configured to receive a first CSFB indication corresponding to the UE that is sent by the mobility management entity (MME) after the user equipment (UE) initiates circuit service fall back (CSFB), the first CSFB indication being used for identifying that the UE needs to return to a long term evolution (LTE) network after circuit service of the UE is finished; and send, according to the first CSFB indication, a second CSFB indication corresponding to the UE to the radio network controller (RNC)/base station controller (BSC) corresponding to the UE when the circuit service of the UE is finished, the second CSFB indication being used for indicating that the RNC/BSC is to notify the UE of returning to the LTE network.

The MME is configured to receive an extended service request message sent by the UE, and send the first CSFB indication corresponding to the UE to the MSC.

The RNC/BSC is configured to receive the second CSFB notification message sent by the MSC, and notify the UE of returning to the LTE network.

The UE is configured to initiate a CSFB request to the MME, receive a notification of returning to the long term evolution (LTE) network sent by the radio network controller RNC/base station controller BSC corresponding to the UE when the circuit service of the user equipment (UE) is finished, and return to the LTE network.

The notification of returning to the LTE network includes a notification of returning to the LTE network, which is sent from the RNC/BSC to the UE after the RNC/BSC receives a second CSFB indication corresponding to the UE that is sent by the mobile switching center (MSC) according to a first CSFB indication received from the mobility management entity (MME).

The first MSC in the another embodiment of the present invention mentioned above may be realized by the MSC in the system for returning to the LTE network provided by the present embodiment.

Another embodiment of the present invention further provides a system for returning to an LTE network. Reference may be made to the architecture shown in FIG. 4. The system includes an MSC, another MSC, an MME, a UE and an RNC/BSC corresponding to the UE.

The MME is configured to receive an extended service request message sent by the UE, and send a first CSFB notification message to the MSC. The MME is further configured to select, before the extended service request message sent by the UE is received, an MSC for the UE and send identification information of the MSC to the UE, so that the UE performs LAU.

The MSC is configured to receive a first CSFB indication sent by the mobility management entity (MME).

The another MSC is configured to execute subsequent CSFB flow, so that the UE performs circuit service in a circuit service (CS) network. The another MSC is further configured to send, after a linking area updating (LAU) request message sent by the UE is received, a circuit service fall back (CSFB) identification message to the MSC, wherein the LAU request message carries identification information of the MSC; receive a CSFB identification reply message sent by the MSC, wherein the identification reply message includes the first CSFB indication; and send, when the circuit service of the UE is finished, a second CSFB indication corresponding to the UE to the RNC/BSC corresponding to the UE, wherein the second CSFB indication is used for indicating that the RNC/BSC corresponding to the UE is to notify the UE of returning to the long term evolution (LTE) network. Further, the CSFB identification message may carry an identification dedicated parameter for indicating that the MSC is to provide the CSFB indication, and the MSC sends the first CSFB indication to the another MSC after the MSC receives the identification dedicated parameter.

The RNC/BSC is configured to receive the second CSFB indication corresponding to the UE that is sent by the another MSC, and notify the UE of returning to the LTE network. After the UE receives the notification of returning to the LTE network, the UE executes subsequent operation of returning to the LTE network, and the UE may continue data service after returning to the LTE network.

The UE is configured to initiate a CSFB request to the MME; receive a notification of returning to the long term evolution (LTE) network sent by the radio network controller (RNC)/base station controller (BSC) corresponding to the UE when the circuit service of the user equipment (UE) is finished; and return to the LTE network.

The notification of returning to the LTE network further includes a notification of returning to the LTE network, which is sent from the RNC/BSC to the UE after the RNC/BSC receives the second CSFB indication corresponding to the UE that is sent by the another MSC according to the first CSFB indication received from the MSC.

The first MSC in the another embodiment of the present invention mentioned above may be realized by the MSC in the system for returning to the LTE network provided by the present embodiment; and functionality of the second MSC in the another embodiment of the present invention mentioned above may be realized by the another MSC in the system for returning to the LTE network provided by the present embodiment.

It should be noted that, for specific description of part of functional modules/units in the MSC, the another MSC, the MME, the UE and in the system for returning to the LTE network provided by the embodiment of the present invention, reference may be made to description of corresponding contents in other embodiments, and will not be redundantly described herein in the embodiment of the present invention.

According to the MSC, the MME, the UE and the system for returning to the LTE network provided by the embodiment of the present invention, the MSC receives the first CSFB indication sent by the MME before a CSFB flow is executed, such that the MSC may distinguish whether a UE needs to return to LTE network after the circuit service of the UE is finished, and thus only a UE with CSFB is notified of returning to the LTE network. Compared with an existing technology in which any UE is instructed to return to the LTE network after circuit service of the UE is finished, the MSC may distinguish a UE of which circuit service is aroused by the CSFB, thereby avoiding a UE which does not need to return to the LTE network from mistakenly returning to the LTE network.

Moreover, when the another MSC provides circuit service after LAU occurs at a UE, the another MSC may receive the first CSFB indication sent by the MSC, so that the another MSC may distinguish a UE of which circuit service is aroused by the CSFB, and a UE which does not need to return to the LTE network may be prevented from mistakenly returning to the LTE network when LAU occurs.

Through the description of the above embodiments, those skilled in the art may clearly understand that, the present invention may be implemented by means of software and necessary general hardware, and certainly may also be implemented with a hardware. However, the former is a better implementation manner under many conditions. Based on such understanding, the substance of the technical solution of the present invention or the part of the present invention making contribution to the prior art may be embodied in the form of a software product, and the computer software product is stored in a readable storage medium, such as, for example, a soft disk of a computer, a hard disk, an optical disk or the like, which includes multiple instructions enabling one computer device (such as a personal computer, a server, a network device or the like) to execute the methods described in the respective embodiments of the present invention.

The foregoing descriptions are merely specific implementation manners of the present invention, rather than limiting the protection scope of the present invention. Any change or substitution that is readily conceived for any one skilled in the art within the technical scope disclosed by the present invention shall fall into the protection scope of the invention. Therefore, the protection scope of the present invention shall be defined by the claims.

What is claimed is:

1. A system for returning to a long term evolution network, comprising:
- a user equipment (UE) comprising a processor and a non-transitory computer-readable storage medium including computer-executable instructions executed by the processor to perform operations comprising:
  - initiating a circuit service fall back (CSFB) to a mobility management entity (MME) for sending a first CSFB indication corresponding to the user equipment (UE), wherein the first CSFB indication is used for identifying that the UE needs to return to a long term evolution (LTE) network after circuit service of the UE is finished, and
  - receiving a notification to the UE to return to the LTE network from a radio network controller/base station controller (RNC/BSC) corresponding to the UE, wherein the notification is sent by the RNC/BSC after receiving a second CSFB indication, wherein the second CSFB indication is used for indicating that the RNC/BSC is to notify the UE to return to the LTE network;
- the MME comprising a processor and a non-transitory computer-readable storage medium including computer-executable instructions executed by the processor to perform operations comprising:
  - receiving a request message for initiating the CSFB from the UE, and
  - sending, after receiving the request message for the CSFB, a first CSFB indication corresponding to the UE to a mobile switching center (MSC);
- the MSC comprising a processor and a non-transitory computer-readable storage medium including computer-executable instructions executed by the processor to perform operations comprising:
  - receiving the first CSFB indication corresponding to the UE that is sent by the MME after the UE initiates the CSFB, wherein the first CSFB indication is used for identifying that the UE needs to return to a LTE network after circuit service of the UE is finished, and
  - sending, according to the first CSFB indication, the second CSFB indication corresponding to the UE to the radio network controller/base station controller (RNC/BSC) corresponding to the UE when the circuit service of the UE is finished,
  - wherein the second CSFB indication is used for indicating that the RNC/BSC is to notify the UE of returning to the LTE network; and
- the RNC/BSC corresponding to the UE, comprising a processor and a non-transitory computer-readable storage medium including computer-executable instructions executed by the processor to perform operations comprising:
  - receiving the second CSFB indication corresponding to the UE that is sent by the first MSC, and
  - notifying the UE to return to the LTE network.

* * * * *